Dec. 14, 1954

H. W. JONES 2,697,193

ELECTRICAL CONTROL APPARATUS

Filed Feb. 13, 1953

WITNESSES:
E. A. McCloskey
Urban H. Faubion

INVENTOR
Hilton W. Jones.
BY
Paul E. Friedemann
ATTORNEY

Dec. 14, 1954

H. W. JONES 2,697,193

ELECTRICAL CONTROL APPARATUS

Filed Feb. 13, 1953

WITNESSES:

INVENTOR
Hilton W. Jones.
BY Paul E. Friedemann
ATTORNEY

United States Patent Office 2,697,193
Patented Dec. 14, 1954

2,697,193

ELECTRICAL CONTROL APPARATUS

Hilton W. Jones, Beaver, Pa., assignor to Westinghouse Electric Corporation, East Pittsburgh, Pa., a corporation of Pennsylvania Application February 13, 1953, Serial No. 336,840

9 Claims. (Cl. 318—226)

This invention relates to the control of the sequence of energization of electrical circuits, as for example, the circuits comprising the windings of a polyphase electric motor.

The control system relates particularly to the proper sequencing of electrical circuits where it is important that if the circuits should be deenergized at any time the sequencing will start at the beginning of a cycle. The particular application shown herein is for the starting of polyphase alternating current motors.

If in starting alternating current electric motors, full line voltage is applied to the motor terminals, the current taken by the motor is excessive and an undesirable surge on the line results. Thus, damage to the motor is likely to result. To eliminate the excessive starting currents, various means have been used to reduce the voltage applied to the primary, or stator, windings during the starting period, such as the use of an ordinary autotransformer, or resistance in series with the stator windings. Another method used to reduce the starting currents is called "part winding starting," which consists in using only a part of the stator winding of the motor for starting and all of the windings when the motor has obtained nearly its full speed. The part winding starting controls heretofore proposed, however, have one or more of the following disadvantages: the control is unduly complex and requires complex switching equipment; special motor windings are required; the control necessitates opening and reclosing the circuit during the starting cycle causing abnormal current peaks; the starting is very slow.

It is an object of this invention to provide a system for energizing electrical circuits in a predetermined sequence and insuring that the circuits are energized only in that sequence.

Another object of this invention is to provide for the starting of alternating current motors with full primary voltage on the primary terminals, whereby only a portion of the primary windings is used for starting and the remaining portions of the primary windings are introduced in a selected sequence so that abnormal starting currents are eliminated and no abnormal current peaks will exist at any point of transition.

A further object of this invention is the provision of a starting control for starting alternating current motors which does not require the use of expensive and complicated equipment.

Another object of this invention is the provision of starting an alternating current motor with a low starting torque which gradually increases until full-load torque is produced.

It is also a somewhat more specific object of this invention to provide for sequentially, in closed circuit transition, connecting the multiple primary windings of an alternating current motor to a source of supply to thus start the motor without any substantial mechanical shock on the motor shaft and thus the load coupled thereto.

The objects recited are merely illustrative. Other objects and advantages will become more apparent from a study of the following specification and the accompanying drawings, in which.

Figure 1:
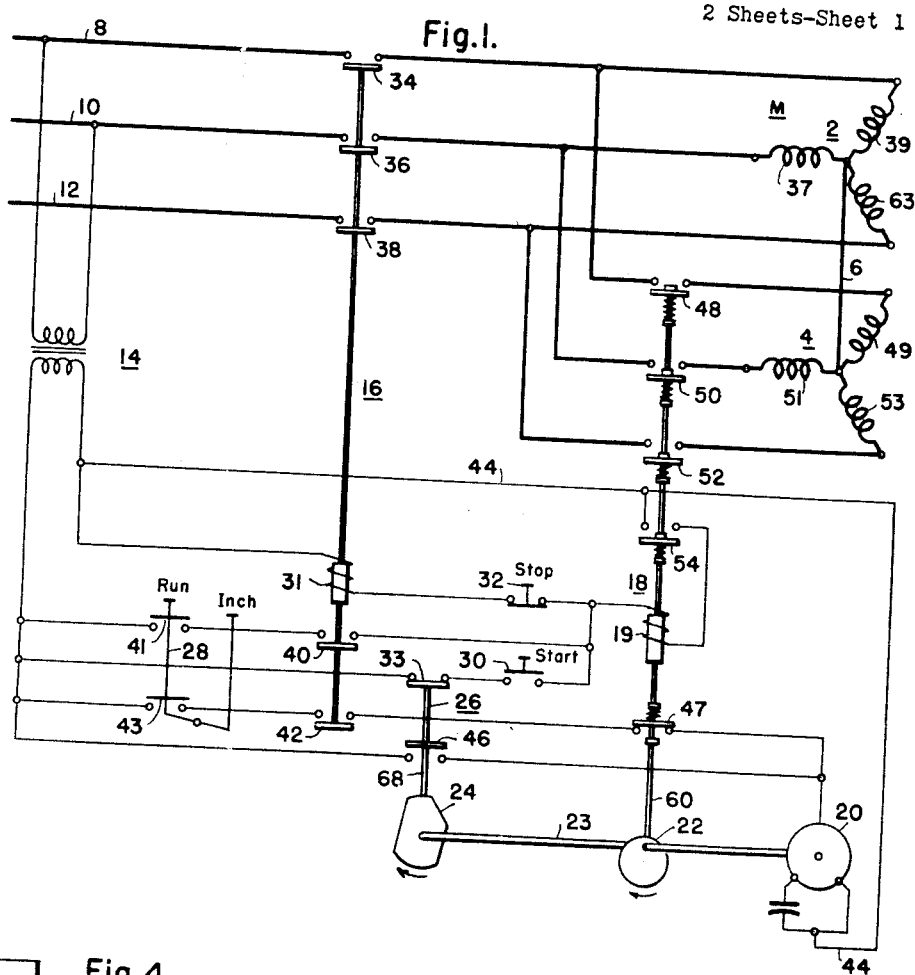
Figure 1 shows diagrammatically the control system applied to the stator windings of an alternating current motor.

With specific reference to the form of the invention illustrated in the drawings, the numeral 2 represents one set of star-connected stator windings for an alternating current motor and the numeral 4 indicates a second set of star connected stator windings for the same alternating current motor. The center points of multiple star connected stator windings are connected to a common junction, in this case represented by lead 6. The bus bars 8, 10 and 12 are energized from a three-phase alternating current supply.

The control system is energized from the secondary winding of the transformer 14. The control system includes a main contactor 16 for connecting the stator windings 2 to the buses 8, 10 and 12, a sequencing contactor 18 for connecting the stator windings 4 to buses 8, 10 and 12 and control apparatus for these contactors. The control apparatus includes a control or pilot motor 20 which drives a first cam 22 for controlling the operation of the sequencing contactor 18, and also a second cam 24 which operates an interlock contactor 26 to insure that the stator windings 2 and 4 cannot be energized until the main contactor 16 and the sequencing contactor 18 are in the proper position to start at the beginning of a starting cycle.

In the particular application shown, when the stator windings 2 are energized with full line voltage the motor draws from 50 to 65% of the full voltage locked rotor current and the starting torque will be from 45 to 55% of the full voltage locked rotor torque. As the windings of stator winding 4 are sequenced in, the torque is gradually increased to full torque with closed circuit transition which prevents sudden mechanical shocks to the driven load and voltage dips and current peaks on the power line.

The control system and its control apparatus cooperate with the star connected stator windings 2 and 4 in the following manner: If the operator desires to have the alternating current motor M to run, the Run push button 28 is depressed and the Start push button 30 is also depressed. Thus, a circuit is completed from the secondary of transformer 14, through the coil 31 of the main contactor 16, the contacts of Stop push button 32, the contacts of the Start push button 30, the contacts 33 of the interlock contactor 26, to the opposite side of the secondary of the transformer 14. The energization of the coil 31 of the main contactor 16 causes the closing of contacts 34, 36 and 38 and thus energizes the star connected stator windings 2 of the alternating current motor. The energization of the coil 31 of the contactor 16 also causes the closing of contacts 40 and 42. The contacts 40 complete a lock-in circuit for the coil 31 of contactor 16 through the upper contacts 41 of the Run push button 28 and the closure of the contacts 42 completes a circuit from the right-hand terminal of the secondary of transformer 14 through lead 44, the control or pilot motor 20, back contacts 47 of the sequencing contactor 18, the contacts 42 of the contactor 16, the lower contacts 43 of the Run push button 28 to the lefthand terminal of the secondary of transformer 14. The control or pilot motor 20 then begins to operate to rotate the cams 22 and 24 in the direction indicated in Fig. 1. The rotation of cam 24 operates the interlock contactor 26 and causes it to close its contacts 46 and open its contacts 33. The opening of the contacts 33 simply opens the circuit of the Start push button 30 previously described and does not affect the energization of the coil 31 of main contactor 16. The closure of the contacts 46 completes a circuit from one side of the control motor 20 to the secondary of the transformer 14, thus making the energization of motor 20 independent of the contacts 42, 43 and 47.

The rotation of the cam member 22 operates the sequencing contactor 18. In the embodiment shown the contacts 48, 50 and 52 of the sequencing contactor 18 are so displaced mechanically that as the cam member 22 operates the sequencing contactor 18, the contacts 48 close first to place leg 49 of the star connected stator windings 4 in parallel with the corresponding leg 39 of the star connected stator windings 2. Contacts 50 close next to place leg 51 of the star-connected stator windings 4 in parallel to the corresponding leg 37 of the star-connected stator windings 2 and contacts 52 close last to connect leg 53 in parallel with leg 63 so that all three legs of the star connected stator windings 4 of the alternating current motor are placed in parallel with the corresponding legs of the star connected stator windings 2. The contacts 54 of the sequencing contactor 18 are so displaced mechanically as to close substantially, simultaneously with the closure of the contacts 52, and the contacts 47 are so displaced mechanically as to open after contacts 48 are closed but before contacts 50 are closed. The surfaces of the cams 22 and 24 are so arranged with respect to each other that the contacts 46 of the interlock contactor 26 will have completed a circuit for the control motor 20 before contactor 18 is magnetically operated and contacts 46 will remain closed until motor 20 has made a full rotation and returned to the position shown in Fig. 1 to open contacts 46.

The closure of the contacts 54 for the sequencing contactor 18 completes a circuit from lead 44 through contacts 54, the coil 19 of the sequencing relay 18, the contacts 40 and 41 to the opposite side of the transformer 14. This circuit locks the sequencing contactor 18 in its closed position magnetically so that the cam 22 no longer affects the operation of the sequencing contactor 18, unless the circuit to the coil 19 of the sequencing contactor is broken.

When the output shaft 23 of the control or pilot motor 20 has made a complete rotation and the sequencing contactor 18 is in its energized position the actuating member 60 of the sequencing contactor no longer rides along the surface of the cam 22. The cam 24 operates the interlock contactor lever 68 and causes the contacts 33 to close and the contacts 46 to open when the output shaft 23 of the control motor 20 has made a full rotation. The opening of the contacts 46 breaks the circuits to the control motor 20 and causes it to stop rotation. The closure of the contacts 33 sets up the circuit for the next operation of the Start push button 30.

If at any time the Stop push button 32 is pushed, its contacts are open and the coil 31 of the main contactor 16 is deenergized. This would cause its contacts 34, 36 and 38 to open the circuit to the stator windings of the alternating current motor M. Its contacts 40 would break the circuit of the coil 19 of the sequencing relay 18 and its contacts 42 would open one of the circuits of the control motor 20. Deenergization of the coil 19 of the sequencing contactor 18 causes its contacts 48, 50 and 52 to open to insure that the star connected stator windings 4 are deenergized. The contacts 54 would be opened to insure that the coil 19 of the sequencing contactor could not be energized until the main contactor 16 is again in its energized position, and the closure of its contacts 47 set up the circuit to the control motor 20 so that it will be ready to run if the contacts 42 of the main contactor 16 are again closed. The same results would be obtained for a failure of power on the bus bars 8, 10 and 12.

If the output shaft 23 of the control motor had not completed a full rotation when the star connected stator windings 2 and 4 were deenergized, the system could not be started again until the rotation had been completed. This is assured by the contacts 33 of the interlock contactor 26. The contacts 33 are opened once the driver motor 20 has started a cycle and thus the circuit of the Start push button 30 is open and even depression of the Start push button cannot complete a circuit for the coil 31 of the main contactor 16. While the contacts 33 of the interlock contactor 26 are open its contacts 46 are closed and therefore, a circuit is completed from the right hand terminal of the secondary of the transformer 14, through lead 44, the control motor 20, the contacts 46, to the other side of the secondary of the transformer 14. Thus, the control motor 20 would continue to run and rotate the cams 22 and 24 until the full cycle had been completed, and the cam 24 had caused the contacts 46 to open and cut off the driver motor 20, and the contacts 32 to close to set up the start circuit.

Figure 2:
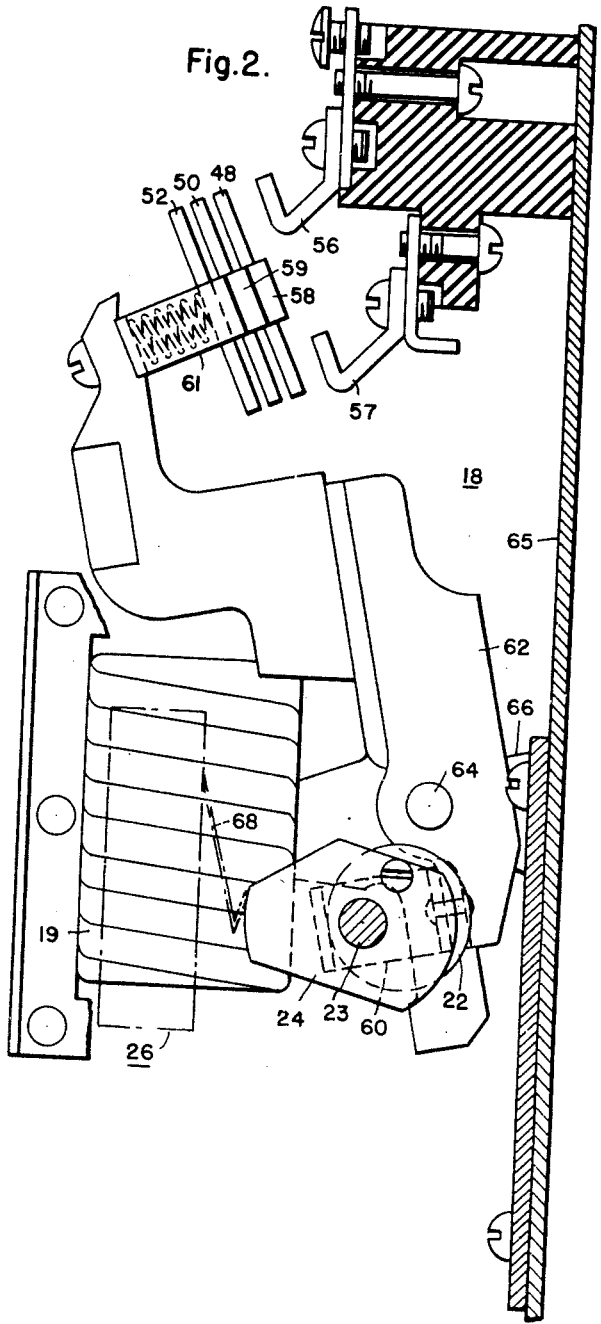
Fig. 2 shows a schematic side view of the cam actuated contactor utilized in the system.

The details of the cam driven sequencing contactor 18 and interlock contactor 26 are shown more clearly in Fig. 2 of the accompanying drawings. The operation is as follows: The control motor 20 rotates the shaft 23, and in so doing rotates the cams 22 and 24. The cam 22 rides on an actuating member 60 of the arm 62 of the sequencing contactor 18. This arm 62 is pivoted about the shaft 64 which is supported on the switch base member 65 by bracket 66 so that as the cam 22 is rotated it causes the arm 62 to rotate clockwise to move the movable contact members 48, 50 and 52 toward their respective stationary contact members. The moving contact 52 will make contact with the stationary contacts 56 and 57. The respective stationary contacts for the movable contacts 48 and 50 are not in view because they are behind the stationary contacts 56 and 57. Notice the physical displacement of the movable contacts 48, 50 and 52 is such that the movable contacts 48 will make contact with their stationary contacts first. The movable contact 50 will then close on its stationary contacts, and the movable contact 52 will close on its stationary contacts 56 and 57 last. The movable contacts 48, 50 and 52 are carried on the contact arm 62 by their respective saddle members 58, 59 and 61, and they are spring biased in position. The coil 19 for the sequencing contactor 18 is shown in Fig. 2.

Figure 3:
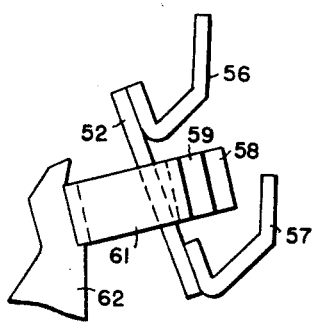
Fig. 3 shows a schematic detailed view of the arm of the contactor and the stationary and movable contacts in a closed position.

Fig. 3 shows a view of a portion of the contact arm 62 and the contact carrying saddle members 58, 59 and 61, with the contacts 48, 50 and 52 closed against their stationary contacts.

As is seen in Fig. 2, the second cam member 24 carried by the rotating shaft 23 has a cam surface which rides against a switch actuating arm 68, which operates an interlock contactor 26.

Figure 4:
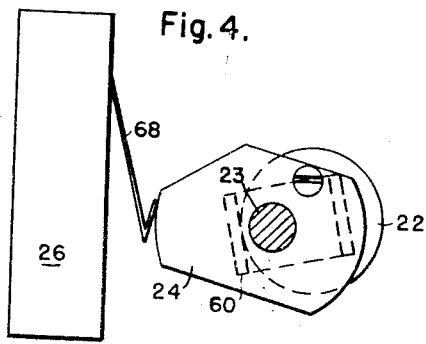
Figs. 4 and 5 are side and top views, respectively, of details of a cam actuated limit switch which is the interlock contactor.
Figure 5:
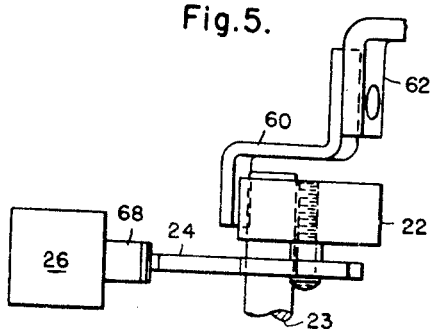

Fig. 4 shows a side view and Fig. 5 shows a bottom view of the switch 26 and its operating members. The views show more clearly how the shaft 23 which is rotated by the control motor 20 causes the second cam member 24 to operate the lever arm 68 and control the contacts 33 and 46 of the interlock contactor 26. The figures also show more clearly how the first cam member 22 is rotated by the shaft 23 and causes the position of actuating member 60 to change and thus control the contacts 48, 50 and 52 of the sequencing contactor 18 to operate as described.

It will be recognized that the objects of the invention have been achieved by providing a method and apparatus for energizing electrical circuits in a predetermined sequence, and if for any reason the operation is interrupted before the cycle is completed for a subsequent energization of the circuits, the cycle must start at its beginning with particular reference to the starting of alternating current motors to which the system is applied here. The electric motor is started at full line voltage on the windings in use at any particular instant so that the starting torque rises gradually without an excessive starting current, and the motor is brought up to rated speed without mechanical shocks on the load, without the use of unduly complicated switching equipment or special windings, and without causing abnormal current peaks during the starting.

While in accordance with the Patent Statutes, one specific embodiment of the invention is illustrated and described in detail, it is to be particularly understood that the invention is not limited thereto or thereby, but that equivalents are within the inventive scope.

I claim as my invention:

1. A starting control for an alternating current motor, in combination, an alternating current motor, a first and a second set of stator windings for said motor, said first and said second sets of stator windings each being connected in a star arrangement, means for connecting said first set of star-connected stator windings to a source of alternating current for starting said motor, means for sequentially placing each leg of said second set of star-connected stator windings in parallel with the corresponding leg of the first set of star-connected stator windings to bring the motor up to rated speed and torque without causing an abnormal starting current.

2. A starting control for an alternating current motor, in combination, an alternating current motor, a first and a second set of stator windings for said motor, said first, and said second sets of stator windings each being connected in a star arrangement, first relay means having first contact means for connecting said first set of star-connected stator windings to a source of alternating current, a coil, a second contact means forming a holding circuit for said coil, and third contact means; a pilot motor adapted to be connected to a voltage source by said third contact means, a cam member driven by said pilot motor, and respective contact members mechanically operated by said cam member to sequentially connect each leg of said second set of star-connected stator windings in parallel with the corresponding leg of the first set of star-connected stator windings to bring said alternating current motor up to speed without causing an abnormal starting current or abnormal peak currents at the transition points.

3. A starting control for an alternating current motor, in combination, an alternating current motor, a first and a second set of stator windings for said motor, said first and said second sets of stator windings each being connected in a star arrangement, first relay means having first contact means for connecting said first set of star-connected stator windings to a source of alternating current, a coil, second contact means for completing a holding circuit for said coil, and third contact means; a pilot motor adapted to be connected to a voltage supply circuit by said third contact means, a first cam member and a second cam member driven by said pilot motor, second relay means mechanically operated by said first cam member, said second relay means comprising a coil and first, second, third, fourth and fifth contact members, said first, second and third contact members of said second relay means being disposed to sequentially connect each leg of said second set of star-connected stator windings in parallel with the corresponding leg of the first set of star-connected stator windings to bring said alternating current motor up to rated speed without causing an abnormal starting current or abnormal peak currents at the transition points, said fourth contact member of said second relay means closing a holding circuit for the coil of said second relay means, said fifth contact member opening the voltage supply circuit which energizes the pilot motor, and cam switch means operated by said second cam member to cause a circuit for said pilot motor to close so the pilot motor continues to operate for a full cycle until said second cam member opens the pilot motor circuit with the pilot motor in position to start a new cycle.

4. In a starting control for an alternating current motor, in combination, an alternating current motor, a first and second set of stator windings for said motor, said first and said second sets of stator windings being respectively connected in a star arrangement, first relay means comprising first contact means for connecting said first set of star-connected stator windings to an alternating current source, a coil, second contact means for competing a holding circuit for said coil, and third contact means; a pilot motor adapted to be connected to a voltage source by said third contact means, a first cam member and a second cam member driven by said pilot motor, second relay means mechanically operated by said first cam member, said second relay means comprising a coil and first, second, third, fourth, and fifth contact members; said first, second and third contact members of said second relay means being disposed to connect each leg of said second set of star connected stator windings in parallel with the corresponding leg of said first set of star-connected stator windings, said fourth contact member of said second relay means being disposed to connect said coil of said second relay to a voltage source and thereby lock said second relay means in its energized position, said fifth contact member of said second relay means being in circuit relationship with said pilot motor and its voltage source to break the circuit of said pilot motor when all of the star-connected stator windings are energized, switch means mechanically operated by said second cam member, said switch means comprising first and second contact members, said first contact member for said switch means being in circuit relationship with said pilot motor and its voltage source and the surface of said second cam member occupying such a relationship with the surface of said first cam member that the said first contact member for said switch means maintains a circuit to energize said pilot motor, after said fifth contact member for said second relay means has opened its circuit, until the driver motor has made a complete cycle; said second contact member of said switch means being in circuit relationship with said coil of said first relay means and said coil of said second relay means, said second contact member of said switch means being so disposed mechanically that it opens its circuit when said first contact member of said switch means has closed the circuit to energize said pilot motor so that if the star-connected stator windings of said main motor are deenergized during the starting cycle they can not be energized again until the pilot motor has made a complete cycle.

5. In a starting control for an alternating current motor, in combination, an alternating current motor, a first and second set of stator windings for said motor, said first and said second sets of stator windings each being connected in a star arrangement, first relay means having first contact means for connecting said first set of star-connected stator windings to an alternating current source, a coil, second contact means for completing a holding circuit for said coil, and third contact means; circuit means for connecting said coil to a voltage source, a pilot motor adapted to be connected to a voltage source by said third contact means, a first cam member and a second cam member driven by said pilot motor, second relay means mechanically operated by said first cam member, said second relay means comprising a coil and first, second, third, fourth, and fifth contact members; said first, second and third contact members being so displaced mechanically that said first contact member closes first, said second contact member closes second, and said third contact member closes third to sequentially connect each leg of said second set of star-connected stator windings in parallel with the corresponding leg of said first set of star-connected stator windings, said fourth and fifth contact members of said second relay means being so displaced with respect to said first, second, and third contact members that the fourth contact member closes and said fifth contact member opens substantially simultaneously with the closing of said third contact member, said coil of said second relay means being in circuit relationship with a voltage source and said fourth contact member so that closure of said fourth contact member causes said coil of said second relay means to be energized to keep said second relay means in its energized position, said fifth contact member being in circuit relationship with said pilot motor and its voltage source to disconnect said pilot motor from its voltage source when all of the second set of star-connected stator windings are energized, cam switch means operated by said second cam member, said cam switch means comprising first and second contact members, said first contact member for said cam switch means being in circuit relationship with said pilot motor and its voltage source and the surface of said second cam member occupying such a relationship with respect to the surface of said first cam member that the said first contact member for said cam switch means maintains a circuit to energize said pilot motor, after said fifth contact member for said second relay means has opened its circuit, until the pilot motor has made a complete cycle, said second contact member of said third cam switch means being in circuit relationship with said coil of said first relay means and said coil of said second relay means, said second contact member of said cam switch means being so disposed mechanically that it opens its circuit when said first contact member of said cam switch means has closed the circuit to energize said pilot motor so that if the star-connected stator windings of said main motor are deenergized during the starting cycle they can not be energized again until the driver motor has made a complete cycle.

6. An electrical control system, in combination, first and second circuit means, first relay means having first contact means for connecting said first circuit means to a voltage source, a coil, second contact means for completing a holding circuit for said coil, and third contact means; means for connecting said coil of said first relay means to a voltage source, a pilot motor adapted to be connected to a voltage supply circuit by said third contact means, a first cam member and a second cam member driven by said pilot motor, second relay means mechanically operated by said first cam member, said second relay means comprising main contact members and a pair of auxiliary contact members, said main contact members being disposed to connect said second circuit means in circuit relationship with said first circuit means, one of said auxiliary contact members being disposed to connect said coil of said second relay means to a voltage source and thereby lock said second relay means in its energized position, the other of said auxiliary contact members being in circuit relationship with said pilot motor and its voltage supply circuit to break the circuit of said pilot motor when said first and said second circuit means are in circuit relationship with each other, cam switch means operated by said second cam member, said cam switch means comprising first and second switches, said first switch being in circuit relationship with said pilot motor and its voltage supply circuit and the surface of said second cam member occupying such a relationship with the surface of said first cam member that the said first switch maintains a circuit to energize said pilot motor, after said other auxiliary contact member for said second relay means has opened its circuit, until the pilot motor has made a complete cycle, said second switch being in circuit relationship with said coil of said first relay means and said coil of said second relay means, said second switch being so disposed that it opens its circuit when said first switch has closed the circuit to energize said pilot motor so that if there is any interruption of energization of said circuit means, the circuit means can not be energized until the driver motor has made a complete cycle and energization will take place only in the proper sequence.

7. An electrical control system, in combination, first and second circuit means, first relay means having first contact means for connecting said first circuit means to a voltage source, a coil, second contact means for completing a holding circuit for said coil, and third contact means; main circuit closing means and contact means for connecting said coil of said first relay means to a voltage source, a pilot motor adapted to be connected to a voltage supply circuit by said third contact means, a first cam member and a second cam member driven by said pilot motor, second relay means operated by said first cam member, said second relay contactor means comprising a coil, a plurality of main contact members and a pair of auxiliary contact members; said plurality of main contact members being disposed to mechanically close sequentially and sequentially connect portions of said second circuit means in circuit relationship with said first circuit means, one of said auxiliary contact members being disposed to connect said coil of said second relay means to a voltage source and thereby lock said second relay means in its energized position, the other of said auxiliary contact members being in circuit relationship with said pilot motor and its voltage supply circuit to break the circuit of said pilot motor when said first and said second circuit means are in circuit relationship with each other, cam switch means operated by said second cam member, said cam switch means comprising first and second switches, said first switch being in circuit relationship with said pilot motor and its voltage supply circuit and the surface of said second cam member occupying such a relationship with the surface of said first cam member that said first switch maintains a circuit to energize said pilot motor, after said other auxiliary contact member for said second relay means has opened its circuit, until the pilot motor has made a complete cycle, said second switch being in circuit relationship with said coil of said first relay means and said coil of said second relay means, said second switch being so disposed that it opens its circuit when said first switch has closed the circuit to energize said pilot motor so that if there is any interruption in energization of circuit means, the said circuit means can not be energized until the driver motor has made a complete cycle and energization will take place only in the proper sequence.

8. An electrical control system, in combination, first and second circuit means, first relay means having first contact means for connecting said first circuit means to a voltage source, a coil, second contact means for completing a holding circuit for said coil and third contact means; means for connecting said coil to a voltage source; a pilot motor adapted to be connected to a voltage source by said third contact means, a first cam member and a second cam member driven by said pilot motor, second relay means mechanically operated by said motor, second relay means, said second relay means comprising first cam member, said second relay means comprising a coil, first, second, third, fourth, and fifth contact members; said first, second, and third contact members being so disposed mechanically that said first contact member closes second, closes first, said second contact member closes third to sequentially connect portions of said second circuit means in circuit relationship with said first circuit means, said fourth and fifth contact members of said second relay means being so displaced with respect to said first, second and third contact members that the fourth contact member closes and said fifth contact member opens substantially simultaneously with the closing of said third contact member, said coil of said second relay means being in circuit relationship with a voltage source and said fourth contact member so that closure of said fourth contact member causes said coil to be energized to keep said second relay means in its energized position, said fifth contact member being in circuit relationship with said pilot motor and its voltage supply circuit to disconnect said pilot motor from its voltage supply circuit when all of said circuit means are energized, cam switch means operated by said second cam member, said cam switch means comprising a first switch and second switch means, said first switch means being in circuit relationship with said pilot motor and its voltage supply circuit and the surface of said second cam member occupying such a relationship with respect to the surface of said first cam member, that said first switch means maintains a circuit to energize said pilot motor, after said fifth contact member for said second relay means has opened its circuit, until the pilot motor has made a complete cycle, said second switch means being in circuit relationship with said coil of said first relay means and said coil of said second relay means, said second switch means being so disposed mechanically that it opens its circuit when said first switch means of said cam switch means has closed the circuit to energize said pilot motor so that if the first and second circuit means are interrupted, said first and second circuit means can not be energized until the pilot motor has made a complete cycle and energization of said circuits can only take place in the preselected sequence.

9. A starting control for an alternating current motor comprising an alternating current motor having first and second sets of stator windings, each set having three windings, means for connecting said first set of windings to a supply of alternating current for starting said motor, a relay having a coil and three contacts, said contacts being mounted on said relay to close in sequence upon operation of said relay and being connected to sequentially connect each winding of said second set of windings in parallel with the corresponding winding of said first set of windings, means for mechanically operating said relay, and a fourth contact on said relay closed by operation of said relay and completing a holding circuit for said coil.

No references cited.